United States Patent [19]
Ohde

[11] Patent Number: 5,790,763
[45] Date of Patent: Aug. 4, 1998

[54] IMAGE PROCESSING APPARATUS AND METHOD

[75] Inventor: Takahiro Ohde, Yokohama, Japan

[73] Assignee: Canon Kabushiki Kaisha, Tokyo, Japan

[21] Appl. No.: 575,885

[22] Filed: Dec. 20, 1995

[30] Foreign Application Priority Data

Dec. 26, 1994 [JP] Japan .................................. 6-322403

[51] Int. Cl.$^6$ ................................................. G06K 15/00
[52] U.S. Cl. .................................... 395/102; 395/109
[58] Field of Search ............................ 395/102, 109,
395/108, 110, 171; 382/254–255; 358/530,
531, 536, 526, 470; 347/131, 211, 237,
251–254

[56] References Cited

U.S. PATENT DOCUMENTS 4,539,704  9/1985  Pastor .
5,270,728  12/1993  Lund et al. ............................ 395/108
5,280,546  1/1994  Machida et al. .
5,351,304  9/1994  Yamamoto .

FOREIGN PATENT DOCUMENTS 0506379  9/1992  European Pat. Off. .
0526186  2/1993  European Pat. Off. .
2167585  5/1986  United Kingdom .

Primary Examiner—Arthur G. Evans
Attorney, Agent, or Firm—Fitzpatrick, Cella, Harper & Scinto

[57] ABSTRACT

An image processing apparatus and method which can perform a thinning process without deteriorating an output quality are provided. The apparatus is constructed by a keyboard to instruct so as to work dot data to be outputted and a CPU to work and form the dot data to be outputted on the basis of a detection result of states of the dot data as a target of the dot data to be outputted and peripheral dot data.

15 Claims, 11 Drawing Sheets

FIG.1

$$X = B \wedge (\overline{A} \vee C)$$

|     | A | B | C | X |
|-----|---|---|---|---|
| (1) | 0 | 0 | 0 | 0 |
| (2) | 0 | 0 | 1 | 0 |
| (3) | 0 | 1 | 0 | 1 |
| (4) | 0 | 1 | 1 | 1 |
| (5) | 1 | 0 | 0 | 0 |
| (6) | 1 | 0 | 1 | 0 |
| (7) | 1 | 1 | 0 | 0 |
| (8) | 1 | 1 | 1 | 1 |

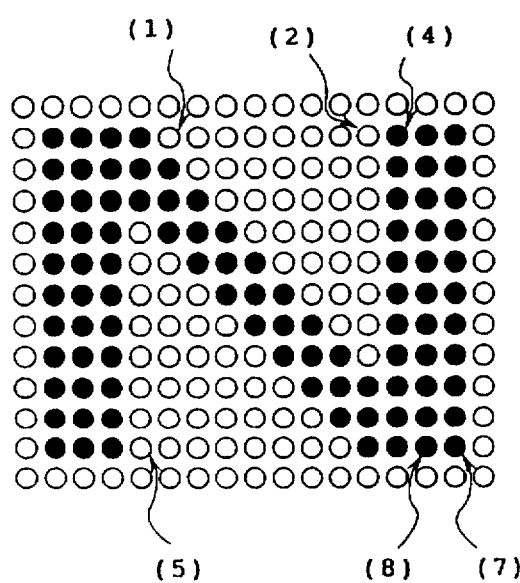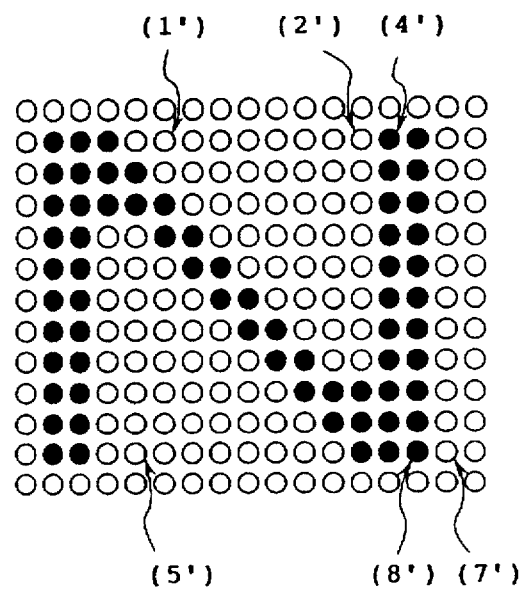
BEFORE PROCESSING
FIG.2A
AFTER PROCESSING
FIG.2B

BEFORE PROCESSING

AFTER PROCESSING

FIG.7A
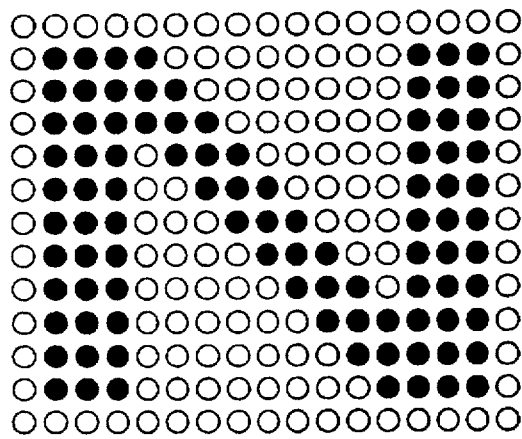
BEFORE PROCESSING
FIG.7B
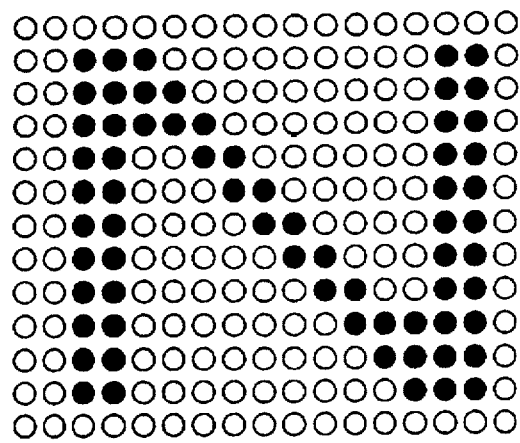
AFTER PROCESSING (LEFT)
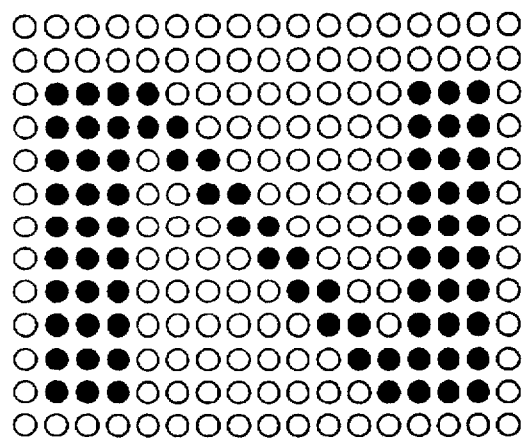
AFTER PROCESSING
(TOP)
FIG.7C
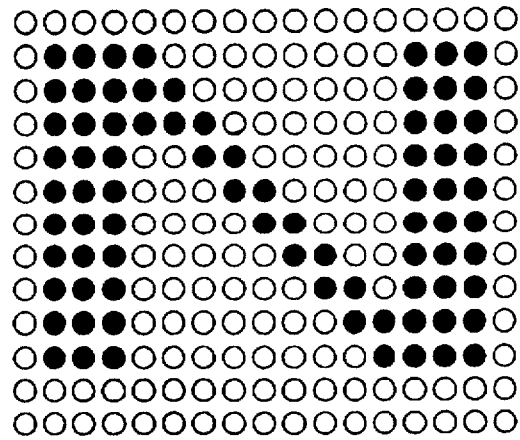
AFTER PROCESSING
(BOTTOM)
FIG.7D

BEFORE PROCESSING

AFTER PROCESSING (ONCE)

AFTER PROCESSING (TWICE)

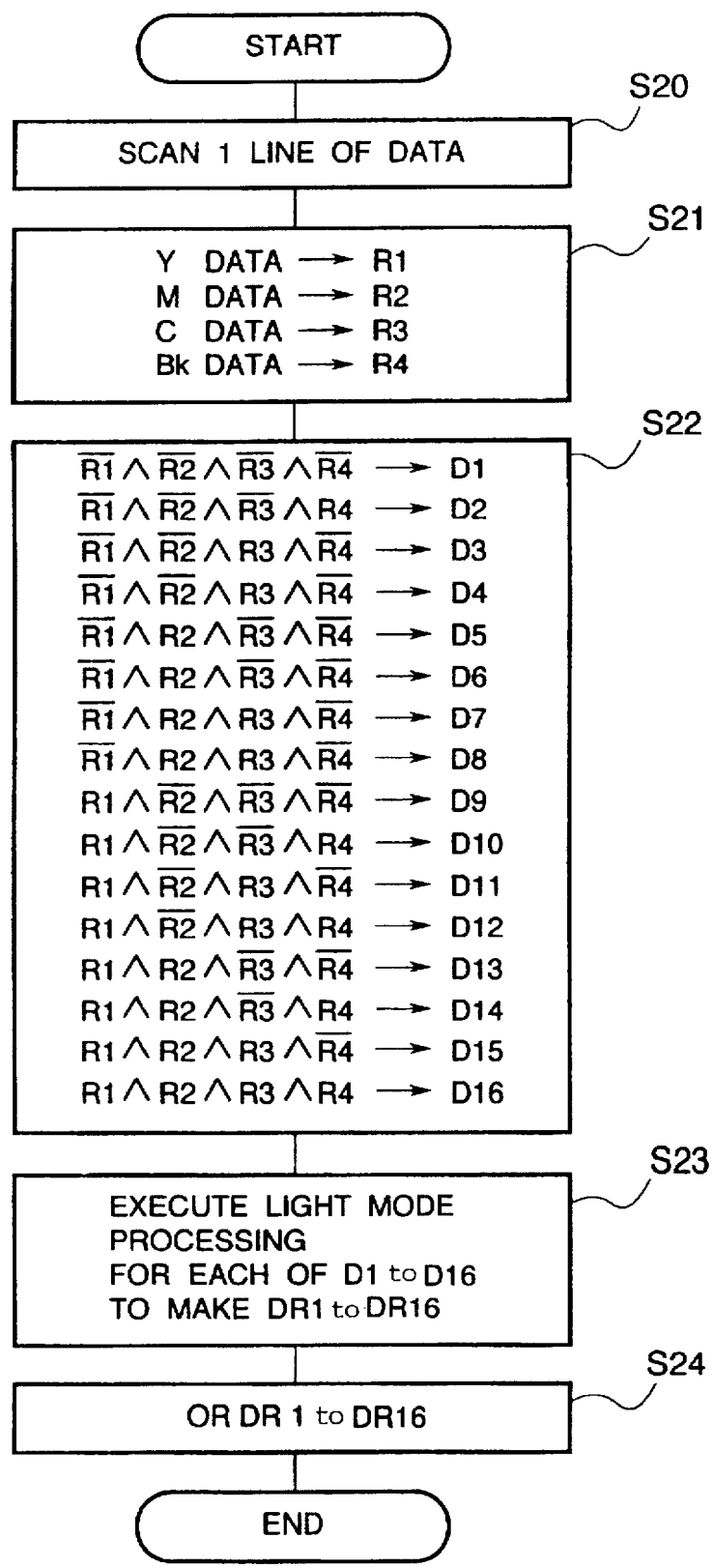

IMAGE PROCESSING APPARATUS AND METHOD

BACKGROUND OF THE INVENTION

1. Field of the Invention

The invention relates to a document forming processing apparatus such as word processor, computer, or the like for transmitting output dot data to an output device or to image processing apparatus and method for processing output dot data which the output device itself has.

2. Related Background Art

When forming output dots, generally, an output device receives, analyzes, and records output pattern data which is transmitted from a document forming processing apparatus such as word processor, computer, or the like.

As a transmitting system of output pattern data, a dot pattern system for dividing the output pattern data every bit and transmitting and a character code system for transmitting a code of an output character (character) are generally recognized.

As for the output pattern data, a demand to output the output pattern data while changing an output density for the purpose of an emphasis or the like of, for example, a character often occurs.

Although a number of methods have been devised as a method of changing the output density, as a method of making the output density high, a process for working the output pattern data such as what is called a "bold" in which output dots are outputted a plurality of number of times while shifting by one dot is generally used. Particularly, in case of the data of the dot pattern system, it is sufficient to get the AND and such an output density changing method can be easily realized.

As a process for making the output density of the output pattern data low, however, only a process called a "thinning" in which the AND of the output pattern data of the dot pattern system and a predetermined dot pattern called a specific mask pattern is outputted as output pattern data or the like exists. Therefore, there is a tendency such that the output density becomes too light. Or, in the document forming processing apparatus, since a free dot pattern can be formed, there is also a case where the mask pattern and the dot pattern formed interfere, so that the output density and output quality remarkably deteriorate.

To solve the above problems, it is necessary to perform a control such that "a mask pattern of a large capacity is possessed", "a plurality of mask patterns are possessed and are switched", "in the case where a dot pattern which coincides with the mask pattern to a certain degree is formed, a special control is executed", or the like, so that a capacity of a ROM increases and a troublesome control is needed.

On the other hand, for example, in the ink jet recording apparatus for emitting an ink and recording an image or the like, a problem such that a character is broken when a small character such as a half size character or the like, a Kanji (Chinese character), or the like is recorded also occurs.

SUMMARY OF THE INVENTION

The present invention is made to solve the above problems and it is an object of the invention to provide image processing apparatus and method which can perform a thinning process without deteriorating an output quality.

To solve the above problems, according to the invention, there is provided an image processing apparatus comprising: instructing means for instructing so as to work dot data to be outputted; detecting means for detecting a state between dot data as a target of the dot data to be outputted and dot data that is adjacent thereto; and forming means for working the dot data to be outputted in accordance with a detection result of the detecting means on the basis of an instruction from the instructing means, thereby forming the dot data. The working is judged on the basis of a simple logic arithmetic operation.

By embodying the invention, there are the following advantages. Namely, a line width of the output dot pattern is made thin and the drawbacks in the conventional "thinning", namely, "the output density becomes too light" and "the output density and output quality in a specific pattern deteriorate" are solved. Further, "broken" of a character which occurs when a small character such as a half size character or the like, a Kanji, or the like is outputted is solved or reduced.

BRIEF DESCRIPTION OF THE DRAWINGS

FIG. 1 is a diagram showing a logic expression and a truth value table serving as a judgment reference in the invention;

FIGS. 2A and 2B comprise a diagram showing an example (N) of a recording dot pattern formed in the case where the invention is embodied in accordance with the logic expression shown in FIG. 1;

FIGS. 7A–7D comprise a diagram showing a recording dot pattern in the case where the invention shown in another embodiment 1 is embodied to the left edge, upper edge, and lower edge;

FIG. 9 is a flowchart showing a light mode data forming procedure of recording dot data constructed by yellow (Y), magenta (M), cyan (C), and black (Bk) shown in another embodiment 3;

BRIEF DESCRIPTION OF THE PREFERRED EMBODIMENTS

The invention will now be described hereinbelow with reference to the drawings. The recording mode in the embodiment is called a "light mode" hereinbelow.

FIG. 1 is a logic expression and a truth value table serving as a judgment reference in the invention. In the diagram, "B" denotes recording dot data as a target to be processed at present. "A" denotes recording dot data which is adjacent to the left side of the data B. "C" indicates recording dot data which is adjacent to the right side of the data B. In the columns of "A", "B", and "C". "1" denotes that the recording dot data exists and "0" indicates that the recording dot data doesn't exist. In the column of "X", "1" indicates that the dots to be actually recorded exist and "0" denotes that the dots to be actually recorded don't exist.

As will be obviously understood from the logic expression and truth value table in the diagram, only in the case where "A=1, B=1, C=0", the value X (=0) is changed from the value of B of original. This is nothing but in the recording pattern data constructed on a dot unit basis, the rightmost edge of the continuous recording dots is set to a processing target. This point is shown in FIGS. 2 and 3.

Figures 3A, 3B:
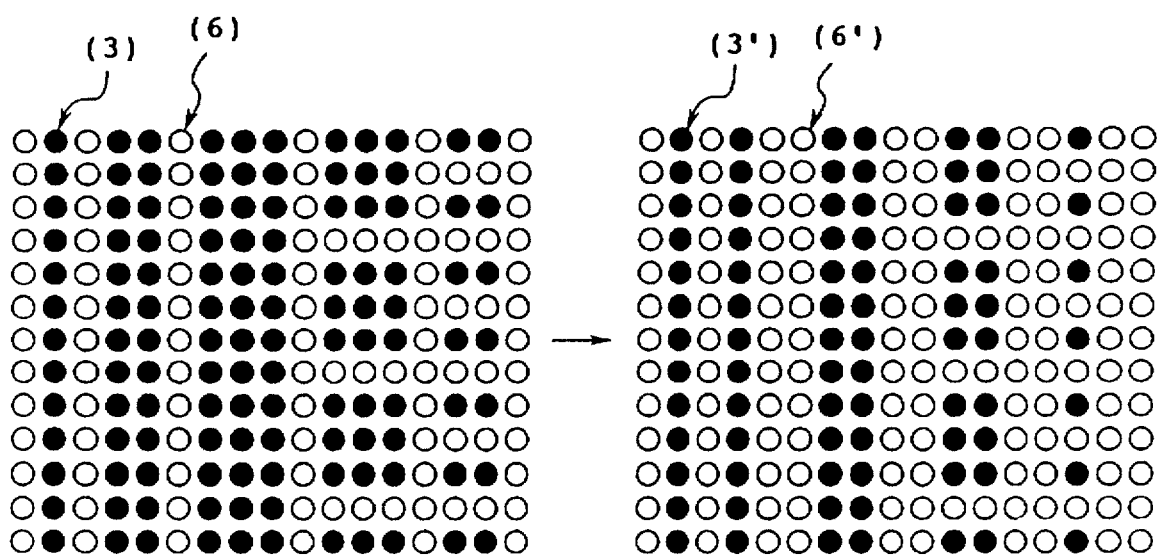
FIGS. 3A and 3B comprise a diagram showing an example (figure including a vertical ruled line of one dot) of a recording dot pattern formed in the case where the invention is embodied in accordance with the logic expression shown in FIG. 1.

FIGS. 2A, 2B and 3A and 3B show examples of the recording dot patterns in the case where the invention is embodied in accordance with the logic expression shown in FIG. 1. FIGS. 2A and 2B, show "N" and FIGS. 3A and 3B shows a figure including a vertical ruled line of one dot. Reference numerals (1) to (8) correspond to (1) to (8) in FIG. 1 and are shown in a manner such that (1) becomes (1') after the process.

Figure 4:
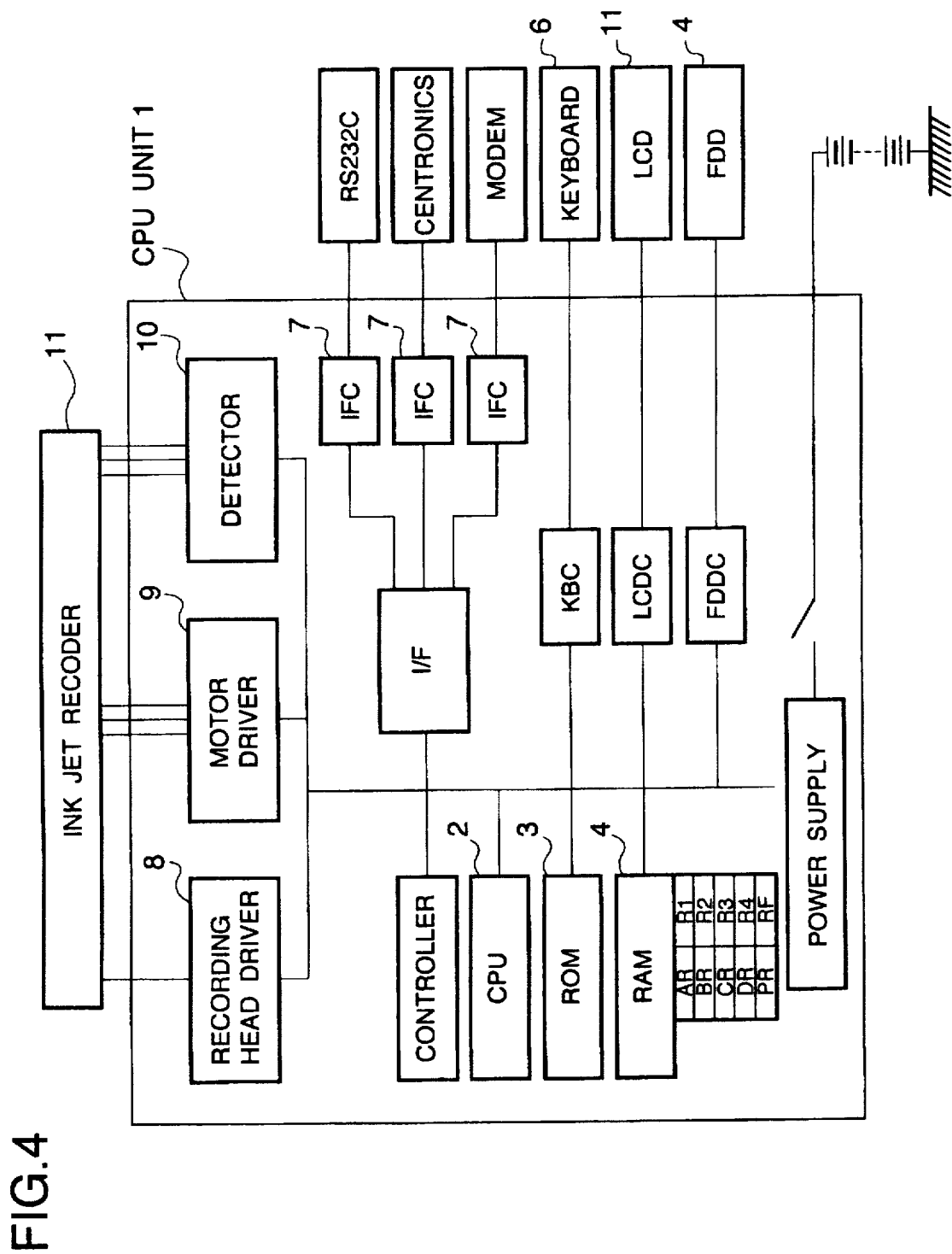
FIG. 4 is a block diagram showing an example of a control system of the invention.

FIG. 4 is a block diagram showing an example of a control system of the invention. A CPU unit 1 shows a document forming processing apparatus such as word processor, computer, or the like. A CPU 2 is a central processing unit for reading out various kinds of programs and data from a ROM 3, a floppy disk drive 4, or the like, which will be explained hereinlater, executes necessary arithmetic operations and judgment, and performs various kinds of controls. The ROM 3 is a read only memory in which various kinds of programs (also including programs according to flowcharts, which will be explained hereinlater) by which the CPU 2 operates and various data such as dot patterns (character generator: CG) and the like which are necessary for recording have been stored. A RAM 5 is a random access memory constructed by: a working area to temporarily store data that is being instructed by the CPU 2 and the arithmetic operation result; a buffer area to store various data inputted from a keyboard 6, an external interface unit 7, the floppy disk drive 4, or the like; a text area to store a document; a VRAM to store data to be displayed to an LCD 12; and the like. The CPU unit 1 is connected to an ink jet recorder 11 through an ink jet recording head driver 8, a motor driver 9, and a detector 10. Registers AR, BR, CR, and DR are provided in the RAM 5 in order to form light mode data in the embodiment and an exclusive-use register PR to transfer the recording data to the recorder 11 is also provided in the RAM 5.

Reference numeral 12 denotes the LCD (liquid crystal display) for performing various kinds of document editions and displaying a message.

Figure 5:
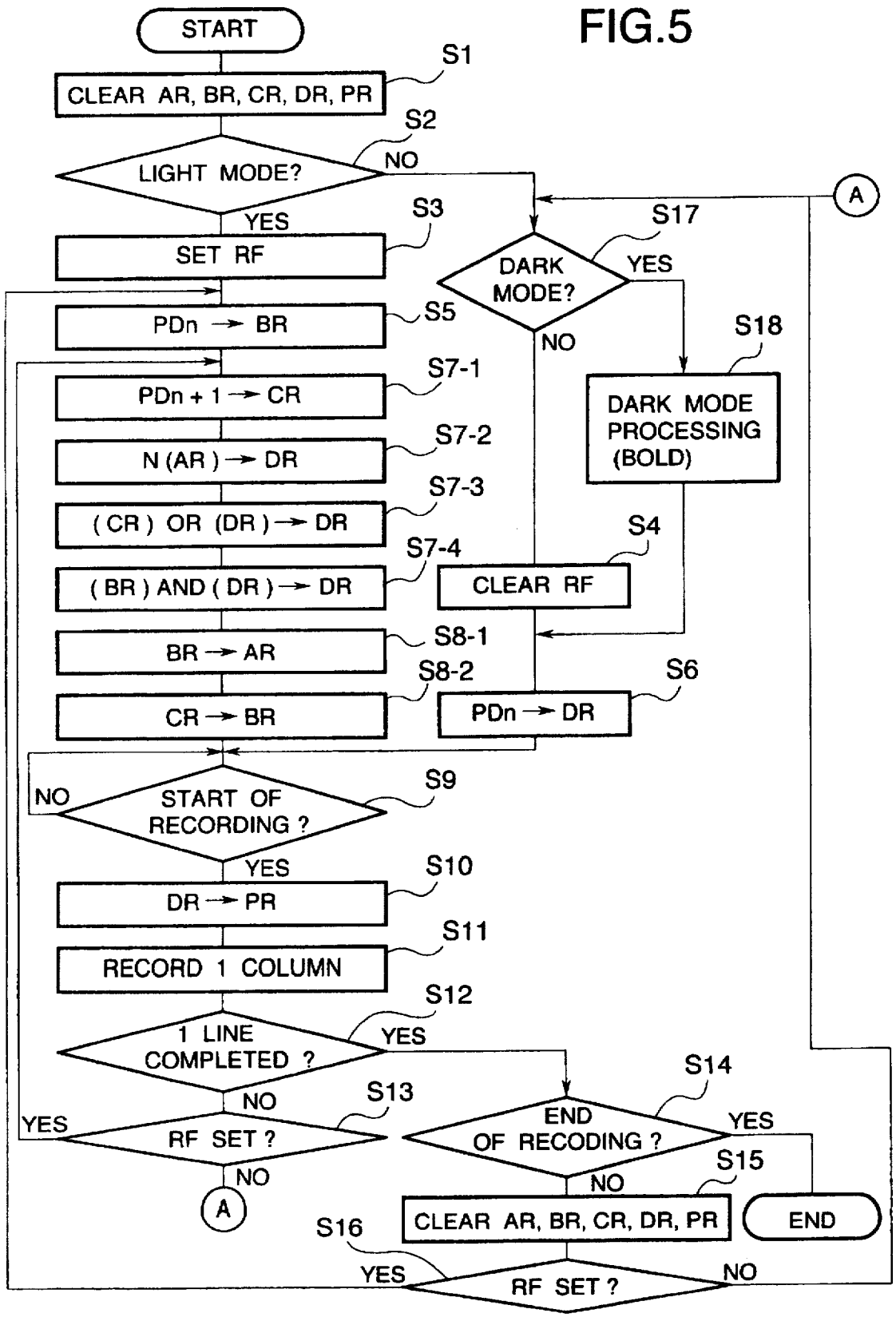
FIG. 5 is a flowchart showing a flow of the operation of the invention.

FIG. 5 is a flowchart showing a flow of the operation of the invention. For simplicity of explanation, the recording dot data is shown by PDn.

As shown in step 1, the registers AR, BR, CR, DR, and PR in the RAM 5 are preliminarily cleared. A check is made to see if the light mode has been designated (step 2). When designating the light mode, any one of a standard mode, a dark mode, and a light mode is designated from a printing set picture plane. By judging the kind of paper, the light mode can be also designated in case of a paper which is easily blurred. When the light mode is designated, a light mode designation flag RF is set (step 3). Subsequently, a check is made in step 17 to see if the dark mode has been designated or not. If NO, the RF flag is cleared (step 4) and the processing routine advances to step 6. When the light mode is designated, processes in steps 5, 7-1 to 7-4, 8-1, and 8-2 are executed. In steps 5 and 7, the logic expression shown in FIG. 1 is realized by a software. After completion of step 7, light mode processing data (X in FIG. 1) is stored into the register DR. In step 8, the contents of the register are moved for the subsequent process. On the other hand, when the dark mode is designated in step 17, step 18 follows and a dark mode process (bolding process) including an RF clearing process is executed. The processing routine advances to step 6. The recording dot data PDn is stored into the register DR in step 6. In the embodiment, the processes in steps 7-1 to 7-4 include a process to form data of 64 dots in the sub scanning direction.

Figure 6:
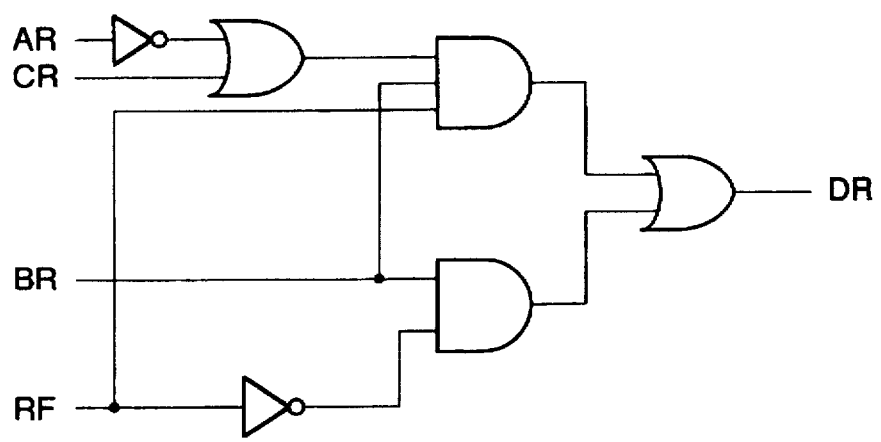
FIG. 6 is a circuit diagram in which processes in steps 5 to 7 in FIG. 5 are realized by a hardware.

When the recording is started (step 9), the contents of the register DR are moved to the register PR (step 10). The recording of one column is performed (step 11). In the embodiment, the ink jet head has one nozzle in the scanning direction and 64 nozzles in the sub scanning direction. The one-column recording denotes that the recording of 64 nozzles is executed in the sub scanning direction. After completion of the recording of one column, a status of the flag RF is confirmed (step 13). Processes from step 5 or 17 are repeated in accordance with the status of the flag RF. After completion of the recording of one line (step 12), the registers AR, BR, CR, DR, and PR are cleared as shown in step 15 and, after that, the status of the flag RF is confirmed (step 16). Processes from step 5 or 17 are repeated in accordance with the status of the flag RF. By repeating the above control, a desired recording dot pattern of the invention can be formed. In the embodiment, although the desired recording dot pattern has been formed by the software, there is no problem even if a desired recording dot pattern is formed by a hardware using a logic circuit (FIG. 6 shows a construction in which the processes in steps 5 to 7 in FIG. 5 are realized by a hardware).

In the embodiment, although the recording dot data has been worked before transferring to the recorder from the document forming processing apparatus such as word processor, computer, or the like, there is no problem even if a construction such that after the original (A, B, C in FIG. 1) recording dot data was accumulated in the buffer built in the recorder, it is worked is used.

As described above, by working the recording dot data in accordance with the logic expression shown in FIG. 1, a line width of the recording dot pattern which is constructed by dots becomes thin and a recording density is sensed by the eyes of the user as if it were made thin. Since the line width becomes thin, the invention is also effective even for a "broken" of a character which hitherto occurred in a small character such as a half size character or the like, a Kanji, or the like. Such a "broken" is eliminated or reduced. The recording dot pattern constructed by one dot is not erased because it corresponds to (3) in FIG. 1. An external appearance doesn't largely change when seeing the printed images before and after the process because it depends on the recording dot pattern. The conventional drawbacks in the "thinning" such that "the recording density becomes too light" and "the recording density and recording quality in a specific pattern deteriorate" can be also eliminated.

[Other embodiments]

The present invention is not limited to the above embodiment but can be also applied to the following embodiments.

(1) In the embodiment, one dot at the rightmost edge of the continuous recording dots has been erased. However, a similar control can be also performed even when one dot at the left edge, upper edge, or lower edge is erased. FIGS. 7A–7D show recording dot patterns obtained by performing a similar control to the left edge, upper edge, and lower edge.

Figure 8A:
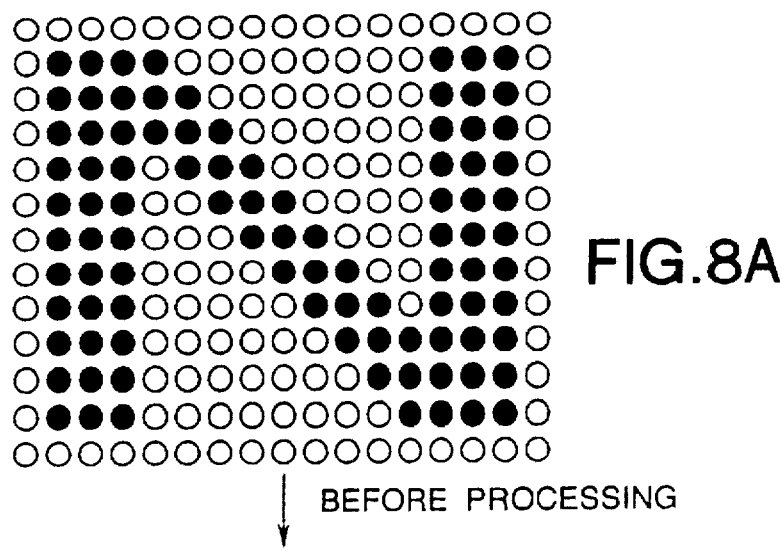
FIGS. 8A–8C comprise a diagram showing a recording dot pattern in the case where the invention shown in another embodiment 2 is embodied twice.
Figure 8B:
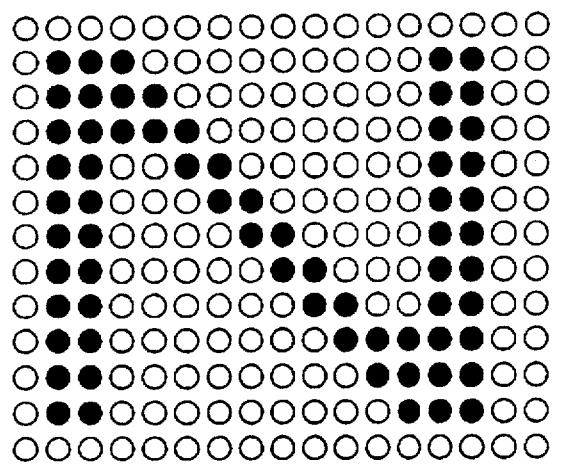
Figure 8C:
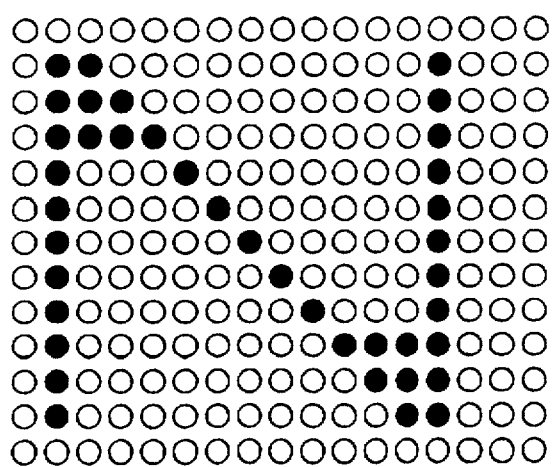

(2) In the embodiment, the working process has been performed only once to the recording dot data. However, it is also possible to perform the working process a plurality of number of times. FIGS. 8A–8B show recording dot pattern obtained by performing the working process twice.

(3) In recent years, the number of applications in which the recording is performed by using a plurality of colors is increasing. In the case where recording dot data constructed by a plurality of colors exists, there is a possibility such that the color changes by performing the invention. In case of recording by using a plurality of colors, therefore, it has to be constructed such that the colors of the dots constructing the target dots are detected and the subsequent dot working processes are executed.

FIG. 9 is a flowchart showing a light mode data forming procedure of the recording dot data constructed by yellow (Y), magenta (M), cyan (C), and black (Bk). RAM areas to store the recording dot data as much as one line of Y, M, C, and Bk are set to R1, R2, R3, and R4, respectively.

As shown in step 20, the recording dot data of one line is scanned and stored into the RAM areas R1, R2, R3, and R4 every data of Y, M, C, and Bk, respectively (step 21). Subsequently, as shown in step 22, sixteen data groups D1 to D16 are formed for the RAM areas R1, R2, R3, and R4 in accordance with logic expressions shown in FIG. 9, respectively. In step 23, light mode processes are executed to the data groups D1 to D16, thereby forming DR1 to DR16, respectively. After that, the ORs of DR1 to DR16 data outputted as recording dot data to the recorder every column.

By executing the above control, light mode data can be formed without changing the color even in the recording dot pattern constructed by a plurality of colors. The above control needs a large amount of RAM areas and, in an apparatus having a function to record by changing an ejection amount, it is also necessary to combine the above embodiment a plurality of number of times. Therefore, when the recording dot pattern constructed by a plurality of colors is detected, a control to inhibit the light mode processes can be also performed.

(4) The invention can also become effective in, particularly, character dot data in the recording dot pattern. On the other hand, in image dot data, since there is a possibility such that a background or the like is changed, even if the above control is performed, an effect can be hardly obtained. Therefore, in an apparatus which can distinguish the character dot data and the image dot data, the embodiment can be also performed to only the character dot data.

Figure 10:
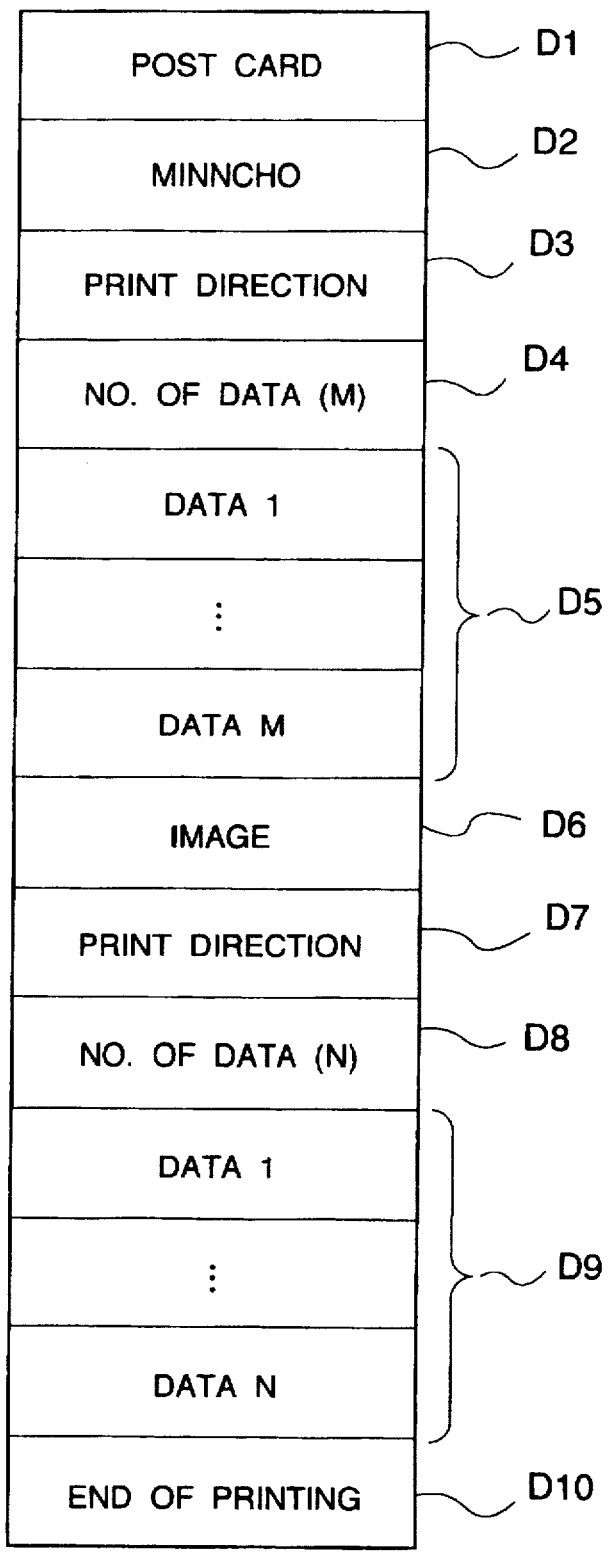
FIG. 10 is a diagram showing an example of a recording data format which can embody another embodiment 4.

FIG. 10 shows an example of a recording data format to which the embodiment can be embodied.

In the diagram, "0" or "1" as a binary number is stored in each of D1 to D10. D1 indicates a bit to detect whether the recording is a postcard recording or not. When bit D1 is equal to "1", the postcard is recognized. When it is "0", a normal recording paper is recognized. D2 is a bit to detect a type style. For example, whether the type style is a Mincho style or an external type style is judged. D3 and D7 are bits to decide the print direction. D5 and D9 are recording dot data. D6 is a bit to decide whether image dots exist or not. Only when D6 is set to "1", it is recognized that the data of D7 is valid. In the recording data with the construction as mentioned above, the embodiment is made valid only in the character dot data which is expressed by D5. The bit of D6 is used as a judgment reference. The bit D6 is used as a judgment reference and when it is equal to "1", as shown in step 4 in FIG. 5, the RF flag is cleared and a control so as to inhibit the light mode can be also performed.

(5) The ink jet recorder 11 shown in FIG. 4 comprises a recording head having an energy generating element to emit the ink and a driving unit to drive the thermal energy generating element. In the ink jet recorder for recording an image or the like by emitting the ink by the recording head, a recording density is determined by an ink amount to be emitted.

Therefore, in the case where the emission amount of the ink is detected and the ink of a predetermined amount or more is emitted, the light mode process is unconditionally executed. When the ink emission amount is equal to or less than the predetermined amount, a control construction to cancel the light mode process can be also used.

Figure 11:
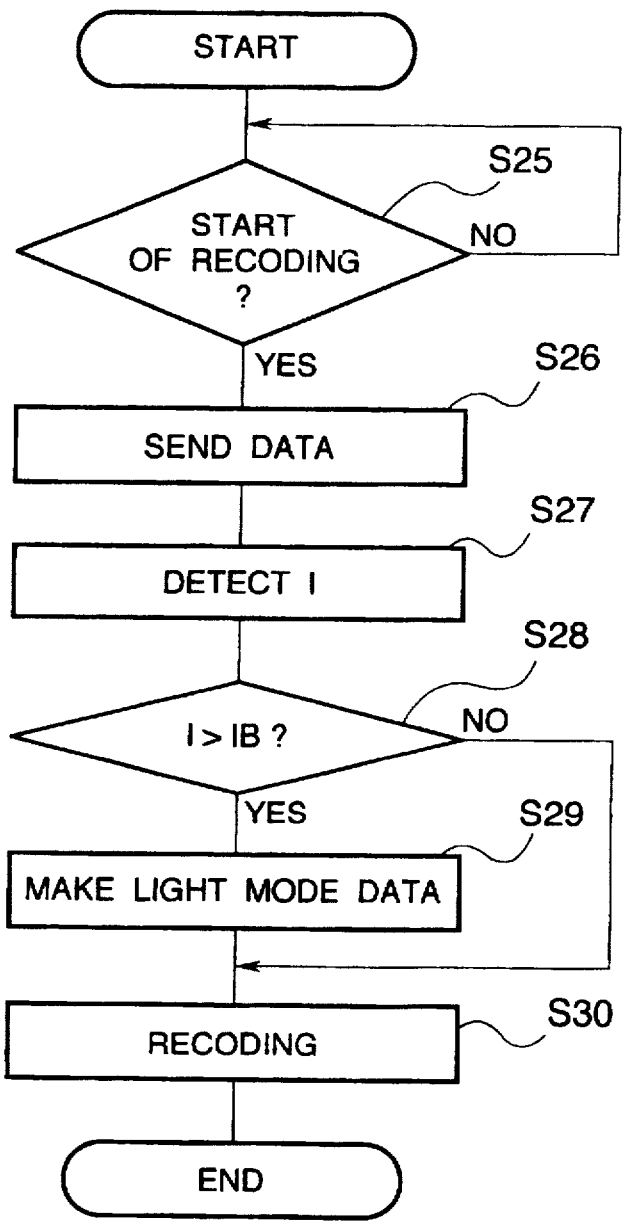
FIG. 11 is a flowchart showing a flow of the operation of another embodiment 5.

FIG. 11 is a flowchart showing a flow of the operation.

After an emission amount set value I was detected (step 27), it is compared with a threshold value IB which has previously been examined and obtained (step 28). When I>IB, the light mode data is unconditionally formed (step 29) and the recording is performed (step 30). When there is a large difference between I and IB, the process in step 29 is repeated a plurality of number of times. Or, it is also possible to use a control construction such that a detector to detect the actual emission amount is provided and the detected actual emission amount is fed back.

Although the recording has been performed by the recorder in the embodiment, the data can be also displayed to the LCD 12.

According to the invention as described above, it is possible to provide the image processing apparatus and method which can solve the problems in the conventional "thinning" such that "the output density becomes too thin" and "the output density and output quality in a specific pattern deteriorate" and which can eliminate or reduce the "broken" of a character in case of outputting, for example, a small character such as a half size character or the like or a Kanji, and in which a high output quality is provided to the user.

What is claimed is:

1. An output apparatus comprising:
    instruction means for providing an instruction for narrowing a dot pattern;
    processing means for, in response to the instruction provided by said instruction means, narrowing the dot pattern without changing the size of the dot pattern such that for a portion of the dot pattern having a number of successive dots, that number is reduced by a predetermined number and for a portion of the dot pattern having one dot, no change is made; and
    output means for outputting the dot pattern narrowed by said processing means.

2. An output apparatus according to claim 1, wherein said processing means narrows the dot pattern in accordance with a logic expression of X=BA($\overline{A \vee C}$), where X is a dot after processing, B is a dot before processing, and A and C are dots adjacent to dot B.

3. An output apparatus according to claim 1, further comprising input means for inputting a character, wherein the dot pattern comprises a pattern corresponding to the character inputted by said input means.

4. An apparatus according to claim 1, wherein said output means comprises an ink jet printer.

5. An output apparatus according to claim 4, further comprising detection means for detecting an ink emission amount of the ink jet printer, wherein said instruction means provides the instruction if said detection means detects the ink emission amount to be equal to or larger than a predetermined value.

6. An output method comprising the steps of:

providing an instruction for narrowing a dot pattern;

narrowing, in response to the instruction provided in said instruction providing step, the dot pattern without changing the size of the dot pattern such that for a portion of the dot pattern having a number of successive dots, that number is reduced by a predetermined number and for a portion of the dot pattern having one dot, no change is made; and outputting the dot pattern narrowed in said narrowing step.

7. A method according to claim 6, wherein said narrowing step narrows the dot pattern in accordance with a logic expression of $X=B\wedge(\overline{A\vee C})$, where X is a dot after processing, B is a dot before processing, and A and C are dots adjacent to dot B.

8. A method according to claim 6, further comprising the step of inputting a character, wherein the dot pattern comprises a pattern corresponding to the character inputted in said inputting step.

9. A method according to claim 6, wherein said outputting step is effected with an ink jet printer.

10. A method according to claim 9, further comprising the step of detecting an ink emission amount of the ink jet printer, wherein said instruction providing step provides the instruction if said detecting step detects the ink emission amount to be equal to or larger than a predetermined value.

11. A memory medium for storing a program comprising the steps of:

providing an instruction for narrowing a dot pattern;

narrowing, in response to the instruction provided in said instruction providing step, the dot pattern without changing the size of the dot pattern such that for a portion of the dot pattern having a number of successive dots, that number is reduced by a predetermined number and for a portion of the dot pattern having one dot, no change is made; and outputting the dot pattern narrowed in said narrowing step.

12. A memory medium according to claim 11, wherein said narrowing step narrows the dot pattern in accordance with a logic expression of $X=B\wedge(\overline{A\vee C})$, where X is a dot after processing, B is a dot before processing, and A and C are dots adjacent to dot B.

13. A memory medium according to claim 11, wherein said program further comprises the step of inputting a character, wherein the dot pattern comprises a pattern corresponding to the character inputted in said inputting step.

14. A memory medium according to claim 11, wherein said outputting step is effected with an ink jet printer.

15. A memory medium according to claim 14, wherein said program further comprises the step of detecting an ink emission amount of the ink jet printer, wherein said instruction providing step provides the instruction if said detecting step detects the ink emission amount to be equal to or larger than a predetermined value.

* * * * *

UNITED STATES PATENT AND TRADEMARK OFFICE
CERTIFICATE OF CORRECTION

PATENT NO. : 5,790,763
DATED : August 4, 1998
INVENTOR(S) : OHDE

It is certified that error appears in the above-indentified patent and that said Letters Patent is hereby corrected as shown below:

In the Drawings:

Sheet 4, Figure 4, "RECODER" should read --RECORDER--.

Sheet 5, Figure 5, "RECODING?" should read --RECORDING?--.

Sheet 10, Figure 10, "MINNCHO" should read --MINCHO--.

Sheet 11, Figure 11, "RECODING" (both occurrences) should read --RECORDING--.

COLUMN 2:
Line 15, " "broken" " should read --"breaking"--.

COLUMN 3:
Line 13, "2B and" should read --2B,--.
Line 16, "2B," should read --2B--.
Line 17, "shows" should read --show--.

UNITED STATES PATENT AND TRADEMARK OFFICE
CERTIFICATE OF CORRECTION

PATENT NO. : 5,790,763
DATED : August 4, 1998
INVENTOR(S) : OHDE

It is certified that error appears in the above-indentified patent and that said Letters Patent is hereby corrected as shown below:

COLUMN 4:
    Line 47, "of a" should be deleted.
    Line 49, " "broken" " should read --"broken" character--.

COLUMN 5:
    Line 5, "pattern" should read --patterns--.
    Line 9, "is" should read --has been--.
    Line 31, "data" should read --are--. (first occurence)

COLUMN 6:
    Line 37, " "broken" " should read --"breaking"--.

Signed and Sealed this

Second Day of March, 1999

Attest:

Q. TODD DICKINSON

*Attesting Officer*     *Acting Commissioner of Patents and Trademarks*